(12) United States Patent
Gagne

(10) Patent No.: US 11,040,735 B1
(45) Date of Patent: Jun. 22, 2021

(54) SHOCK-ABSORBING WHEEL BARROW SUSPENSION SYSTEM

(71) Applicant: Jared Gagne, Berkley, MA (US)

(72) Inventor: Jared Gagne, Berkley, MA (US)

(*) Notice: Subject to any disclaimer, the term of this patent is extended or adjusted under 35 U.S.C. 154(b) by 36 days.

(21) Appl. No.: 16/589,193

(22) Filed: Oct. 1, 2019

(51) Int. Cl.
  *B62B 3/02* (2006.01)
(52) U.S. Cl.
  CPC ............ *B62B 3/02* (2013.01); *B62B 2301/20* (2013.01)
(58) Field of Classification Search
  CPC .................................................. B62B 1/18–24
  See application file for complete search history.

(56) References Cited

U.S. PATENT DOCUMENTS

| | | | |
|---|---|---|---|
| 167,198 A | 8/1875 | Van Hoonnf | |
| 1,031,454 A * | 7/1912 | Lawrence | B62B 1/18 280/47.31 |
| 1,327,578 A * | 1/1920 | Vessey | B62B 1/24 37/434 |
| 1,578,213 A * | 3/1926 | Smith | B62B 1/18 280/47.31 |
| 1,701,486 A * | 2/1929 | Askren | B62B 1/18 298/2 |
| 1,768,053 A * | 6/1930 | Hallowell | B62B 1/18 280/47.27 |
| 1,831,026 A * | 11/1931 | Nessan | B62B 1/18 280/47.24 |
| 1,951,477 A | 3/1934 | Gannett | |
| 2,250,797 A * | 7/1941 | Garlinghouse | B62B 1/183 280/47.22 |
| 2,484,677 A * | 10/1949 | Binz | B62B 1/208 280/38 |
| 2,532,966 A * | 12/1950 | Thomas | B62B 1/18 280/47.33 |
| 2,553,334 A * | 5/1951 | Schmidt | B62B 1/206 280/47.31 |
| 2,588,503 A * | 3/1952 | Dwyer | B62B 1/183 280/47.22 |
| 2,800,335 A * | 7/1957 | Clapp | B62B 1/208 280/42 |
| 2,852,304 A * | 9/1958 | Harrison | B62B 1/24 298/3 |
| 2,954,195 A * | 9/1960 | Dobbs | B62B 1/18 248/101 |
| 3,166,339 A * | 1/1965 | Earley | B62B 1/147 280/654 |
| 3,199,891 A * | 8/1965 | Grable | B62B 1/183 280/47.31 |
| 3,248,128 A * | 4/1966 | Grable | B62B 1/18 280/47.31 |
| 4,223,907 A * | 9/1980 | Kelly | B62B 1/002 280/408 |

(Continued)

FOREIGN PATENT DOCUMENTS

FR   2737695   2/1997

*Primary Examiner* — Erez Gurari

(57) ABSTRACT

The shock-absorbing wheel barrow suspension system is a cart. The shock-absorbing wheel barrow suspension system is a manually powered rolling structure that is controlled by a single person. The shock-absorbing wheel barrow suspension system has a dual wheel structure. The combination of the dual wheel structure and the shock absorbing capability makes the shock-absorbing wheel barrow suspension system easier to control when compared to a traditional wheelbarrow.

16 Claims, 3 Drawing Sheets

(56) References Cited

U.S. PATENT DOCUMENTS

| | | | | |
|---|---|---|---|---|
| 4,244,595 A * | 1/1981 | Sagert | B62B 1/22 | 280/47.29 |
| 4,261,590 A * | 4/1981 | Schupbach | B62B 1/18 | 280/47.31 |
| 4,589,508 A * | 5/1986 | Hoover | B62B 1/24 | 180/13 |
| 4,854,601 A * | 8/1989 | Herndon | B62B 1/18 | 280/47.31 |
| 5,149,116 A * | 9/1992 | Donze | B62B 1/20 | 280/47.26 |
| 5,687,979 A * | 11/1997 | Plevka | B62B 1/20 | 280/47.19 |
| 5,758,887 A * | 6/1998 | Bobst | B62B 1/18 | 280/47.24 |
| 5,915,706 A * | 6/1999 | Mosley | B62B 1/20 | 280/47.26 |
| 6,099,025 A * | 8/2000 | Rohrs | B62B 1/20 | 280/47.17 |
| D535,451 S * | 1/2007 | Lim | D34/16 | |
| 9,156,487 B1 * | 10/2015 | Blume | B62B 1/22 | |
| D778,521 S * | 2/2017 | Bell | D34/27 | |
| D809,732 S * | 2/2018 | Lee | D34/27 | |
| 2005/0275174 A1 * | 12/2005 | Mullen | B62B 1/24 | 280/47.26 |
| 2006/0103088 A1 * | 5/2006 | Robinson | B62B 1/18 | 280/47.31 |
| 2007/0007738 A1 * | 1/2007 | Albert | B62B 1/206 | 280/47.31 |
| 2007/0052187 A1 * | 3/2007 | Browder | B62B 1/18 | 280/47.31 |
| 2008/0079228 A1 * | 4/2008 | Rye | B62B 1/20 | 280/47.31 |
| 2008/0116666 A1 * | 5/2008 | Morris | B62B 3/08 | 280/659 |
| 2011/0101635 A1 * | 5/2011 | Sepeck, III | B62B 5/06 | 280/47.31 |
| 2012/0126502 A1 * | 5/2012 | Robinson | B62B 1/206 | 280/47.31 |
| 2015/0040948 A1 * | 2/2015 | Sickler | B62B 1/204 | 134/21 |
| 2015/0321685 A1 * | 11/2015 | Smoot | B62B 1/18 | 280/47.26 |
| 2015/0329131 A1 * | 11/2015 | Dumas | B62B 1/18 | 280/47.31 |
| 2016/0144757 A1 * | 5/2016 | Romas | B62B 1/24 | 298/2 |
| 2018/0257686 A1 * | 9/2018 | Paino | B62B 1/26 | |
| 2019/0380534 A1 * | 12/2019 | Patterson | A47J 37/0763 | |
| 2020/0139996 A1 * | 5/2020 | Jadonath | B62B 1/266 | |
| 2020/0359597 A1 * | 11/2020 | Hassan | B62B 1/18 | |

* cited by examiner

SHOCK-ABSORBING WHEEL BARROW SUSPENSION SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation including hand propelled vehicles, more specifically, a wheel barrow with spring mounted wheels. (B62B1/183)

SUMMARY OF INVENTION

The shock-absorbing wheel barrow suspension system is a cart. The shock-absorbing wheel barrow suspension system is a manually powered rolling structure that is controlled by a single person. The shock-absorbing wheel barrow suspension system has a dual wheel structure. The dual wheel structure further absorbs shocks that occur during the use of the shock-absorbing wheel barrow suspension system. The combination of the dual wheel structure and the shock absorbing capability makes the shock-absorbing wheel barrow suspension system easier to control when compared to a traditional wheelbarrow. The shock-absorbing wheel barrow suspension system comprises an anterior chassis, a handle structure, a posterior pedestal structure, and a tank. The anterior chassis, the handle structure, and the posterior pedestal structure attach to the tank. The anterior chassis is a rolling structure that elevates the anterior region of the tank above a supporting surface. The posterior pedestal structure raises the posterior region of the tank above the supporting surface. The handle allows the person to manipulate the shock-absorbing wheel barrow suspension system.

These together with additional objects, features and advantages of the shock-absorbing wheel barrow suspension system will be readily apparent to those of ordinary skill in the art upon reading the following detailed description of the presently preferred, but nonetheless illustrative, embodiments when taken in conjunction with the accompanying drawings.

In this respect, before explaining the current embodiments of the shock-absorbing wheel barrow suspension system in detail, it is to be understood that the shock-absorbing wheel barrow suspension system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the shock-absorbing wheel barrow suspension system.

It is therefore important that the claims be regarded as including such equivalent construction insofar as they do not depart from the spirit and scope of the shock-absorbing wheel barrow suspension system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
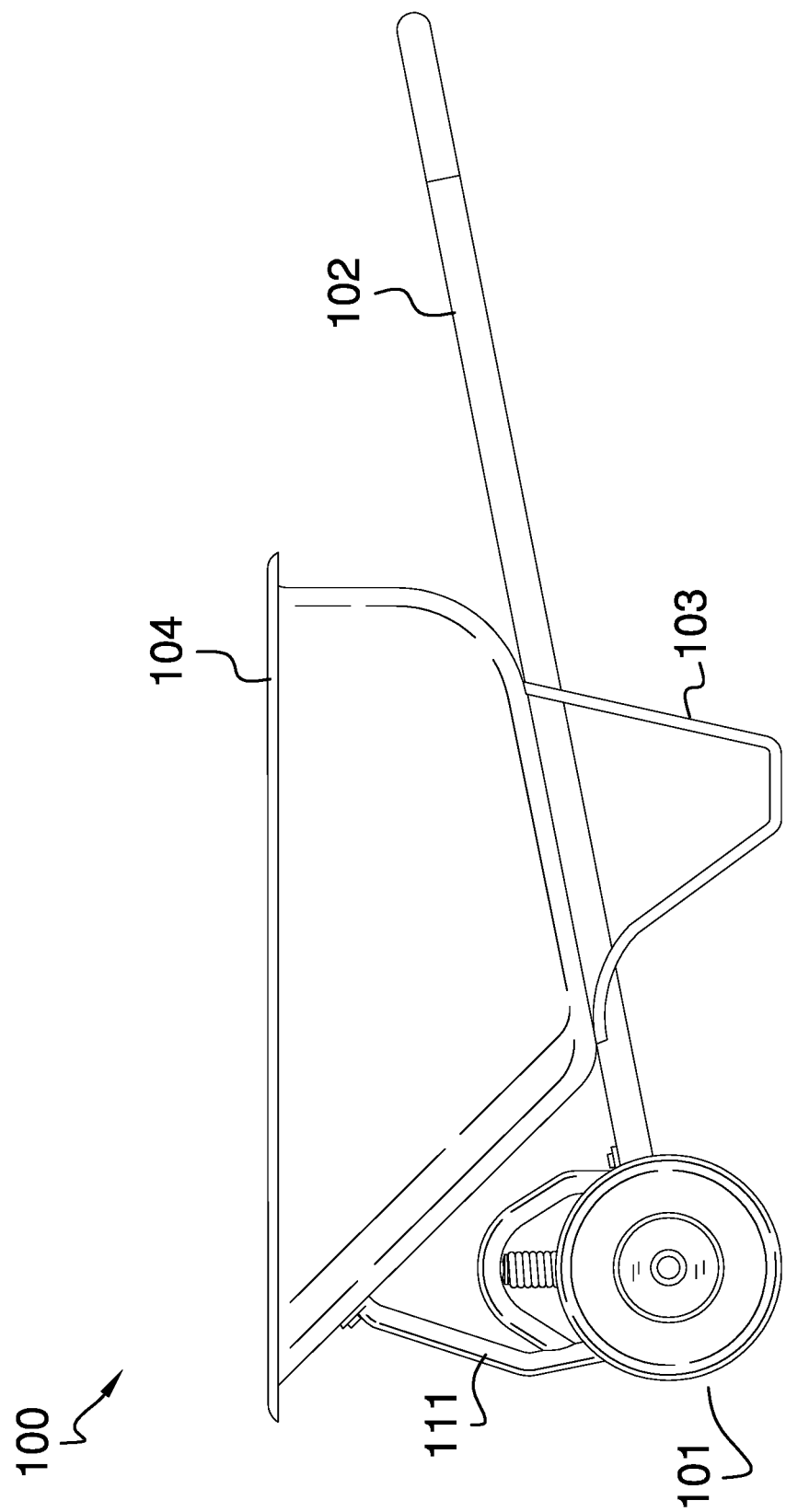
FIG. 1 is a port side view of an embodiment of the disclosure.
Figure 2:
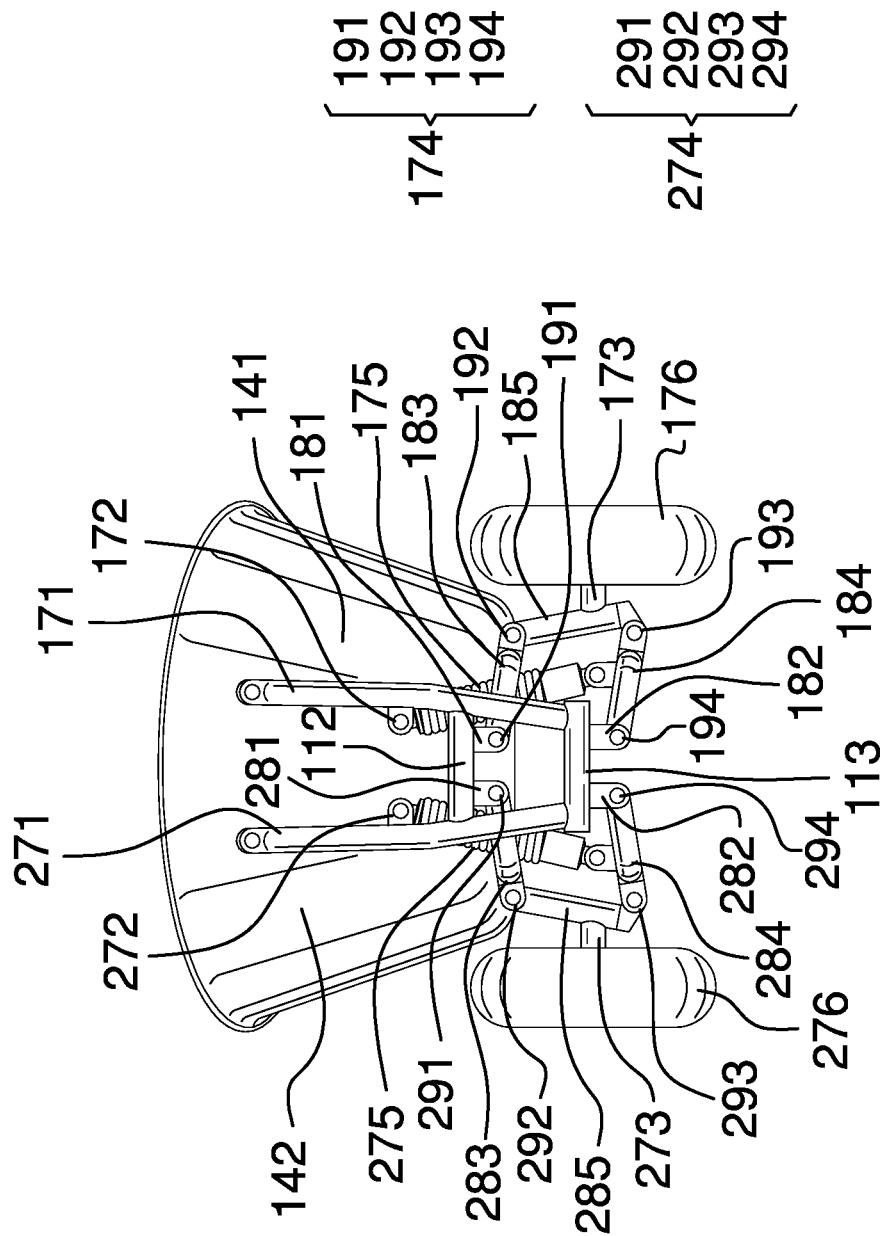
FIG. 2 is an anterior side view of an embodiment of the disclosure.
Figure 3:
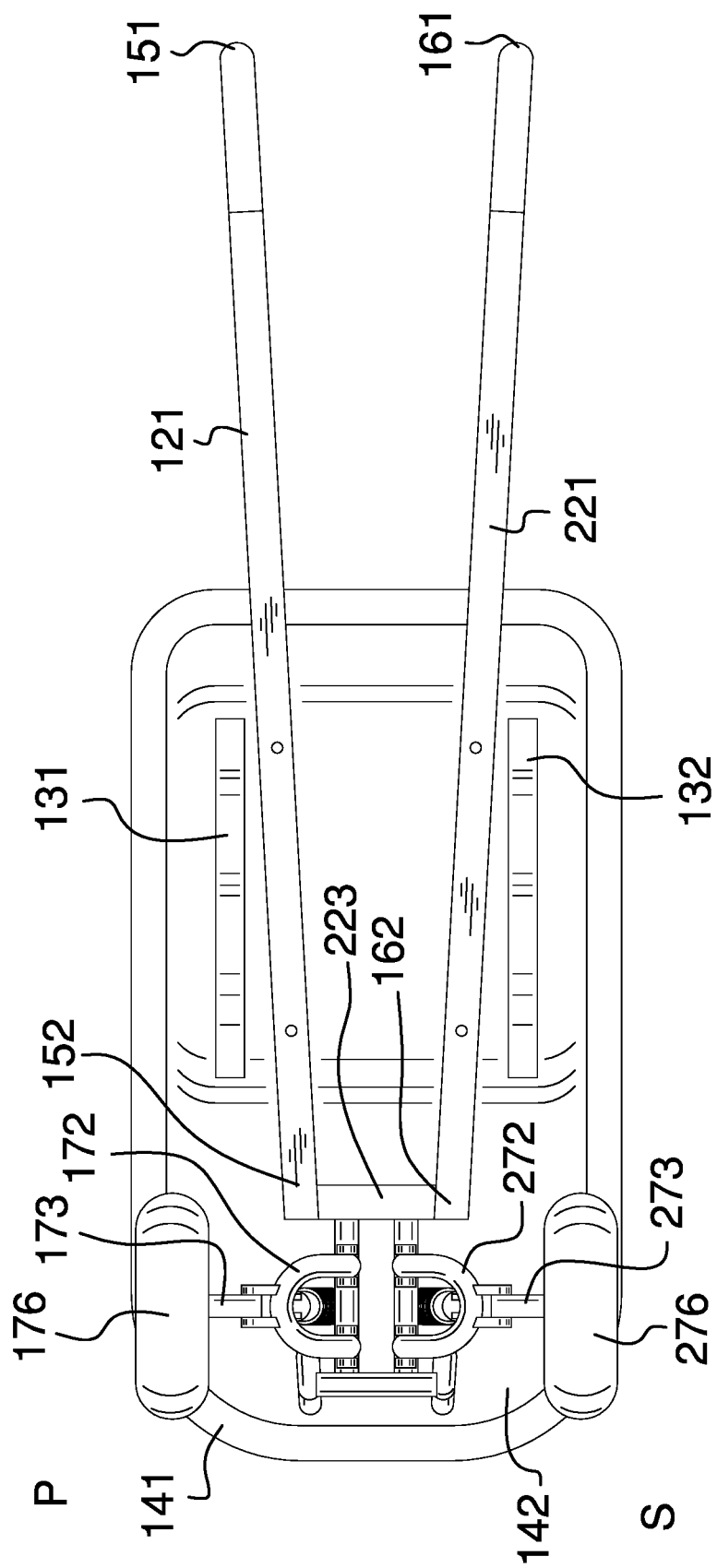
FIG. 3 is an inferior side view of an embodiment of the disclosure.

Detailed reference will now be made to one or more potential embodiments of the disclosure, which are illustrated in FIGS. 1 through 3.

The shock-absorbing wheel barrow suspension system 100 (hereinafter invention) is a cart. The invention 100 is a manually powered rolling structure that is controlled by a single person. The invention 100 has a dual wheel structure. The dual wheel structure further absorbs shocks that occur during the use of the invention 100. The combination of the dual wheel structure and the shock absorbing capability makes the invention 100 easier to control when compared to a traditional wheelbarrow. The invention 100 comprises an anterior chassis 101, a handle structure 102, a posterior pedestal structure 103, and a tank 104. The anterior chassis 101, the handle structure 102, and the posterior pedestal structure 103 attach to the tank 104. The anterior chassis 101 is a rolling structure that elevates the anterior region of the tank 104 above a supporting surface. The posterior pedestal structure 103 raises the posterior region of the tank 104 above the supporting surface. The handle structure 102 allows the person to manipulate the invention 100. The tank 104 forms the containment structure of the invention 100.

The tank 104 is a pan shaped structure. The tank 104 forms the superior structure of the invention 100. The tank 104 forms a containment structure that allows the invention 100 to be used for transporting objects.

The anterior chassis 101 is a rolling structure. The anterior chassis 101 attaches to the exterior surface of the tank 104 and the handle structure 102. The anterior chassis 101 forms the bow structure of the invention 100. The anterior chassis 101 elevates the tank 104 above the supporting surface. The anterior chassis 101 rolls along the supporting surface when the handle structure 102 is used to raise the stern of the invention 100. The anterior chassis 101 comprises a plurality of chassis structures 111, a superior brace 112, and an inferior brace 113.

Each of the plurality of chassis structures 111 is a mechanical structure. Each of the plurality of chassis structures 111 is a structure that attaches to the forward exterior surfaces of the tank 104. Each of the plurality of chassis structures 111 is a rolling structure of the invention 100. Each of the plurality of chassis structures 111 enables the invention 100 to roll over the supporting surface. Each of the plurality of chassis structures 111 elevates the tank 104 above the supporting surface. The plurality of chassis structures 111 comprises a port chassis structure 141 and a starboard chassis structure 142.

The port chassis structure 141 is a mechanical structure. The port chassis structure 141 is the chassis structure selected from the plurality of chassis structures 111 that supports the port side of the tank 104. The port chassis structure 141 elevates the port side of the tank 104 above the supporting surface. The port chassis structure 141 is a rolling structure. The port chassis structure 141 forms a spring-loaded structure that absorbs transient impact forces that are applied to the port chassis structure 141 during the use of the invention 100. The port chassis structure 141 comprises a port suspension shaft 171, a port spring 175 mount 172, a port wheel 176 mount 173, a plurality of port pivots 174, a port spring 175, and a port wheel 176.

The port suspension shaft 171 is a non-Euclidean prism structure. The port suspension shaft 171 is a rigid structure. The port suspension shaft 171 attaches the port chassis structure 141 to the forward exterior surface of the tank 104.

The port spring 175 mount 172 is a non-Euclidean prism structure. The port spring 175 mount 172 is a rigid structure. The port spring 175 mount 172 is a fixed structure that forms the superior anchor point for the port spring 175.

The port wheel 176 mount 173 is a prism structure. The port wheel 176 mount 173 is a rigid structure. The port wheel 176 mount 173 attaches the port wheel 176 to the balance of the port chassis structure 141 such that the port wheel 176 rotates relative to the port chassis structure 141. The port wheel 176 mount 173 further comprises a port superior arm mount 181, a port inferior arm mount 182, a port superior arm 183, a port inferior arm 184, and a port axle arm 185.

The port superior arm mount 181 is a rigid structure. The port superior arm mount 181 is a prism-shaped structure. The port superior arm mount 181 forms an anchor point on the superior brace 112 of the anterior chassis 101.

The port inferior arm mount 182 is a rigid structure. The port inferior arm mount 182 is a prism-shaped structure. The port inferior arm mount 182 forms an anchor point on the superior brace 112 of the anterior chassis 101.

The port superior arm 183 is a rigid structure. The port superior arm 183 is a prism-shaped structure. The port superior arm 183 is a roughly horizontally oriented structure that attaches the port axle arm 185 to the port superior arm mount 181.

The port inferior arm 184 is a rigid structure. The port inferior arm 184 is a prism-shaped structure. The port inferior arm 184 is a roughly horizontally oriented structure that attaches the port axle arm 185 to the port inferior arm mount 182.

The port axle arm 185 is a rigid structure. The port axle arm 185 is a prism-shaped structure. The port axle arm 185 is a roughly vertically oriented structure that attaches the port wheel 176 mount 173 to the port superior arm 183. The port axle arm 185 is a roughly vertically oriented structure that attaches the port wheel 176 mount 173 to the port superior arm 183.

Each of the plurality of port pivots 174 is a hardware item. Each of the plurality of port pivots 174 is a fastening device that attaches a first element of the port chassis structure 141 to a second element of the port chassis structure 141 such that the first element rotates relative to the second element. The plurality of port pivots 174 comprises a first port pivot 191, a second port pivot 192, a third port pivot 193, and a fourth port pivot 194.

The first port pivot 191 is a rotating fastening device. The first port pivot 191 is identical to the first starboard pivot 291. The second port pivot 192 is a rotating fastening device. The second port pivot 192 is identical to the first port pivot 191. The third port pivot 193 is a rotating fastening device. The third port pivot 193 is identical to the second port pivot 192. The fourth port pivot 194 is a rotating fastening device. The fourth port pivot 194 is identical to the third port pivot 193.

The port spring 175 is a mechanical structure. The port spring 175 forms a compression spring. The port spring 175 absorbs transient forces that are applied to the invention 100. In the first potential embodiment of the disclosure, the port spring 175 is a helical coil spring.

The port wheel 176 is a rotating structure. The port wheel 176 transfers a portion of the load of the invention 100 to the supporting surface. The port wheel 176 allows the invention 100 to roll over the supporting surface. The wheel and the spring are defined elsewhere in this disclosure.

The starboard chassis structure 142 is a mechanical structure. The starboard chassis structure 142 is the chassis structure selected from the plurality of chassis structures 111 that supports the starboard side of the tank 104. The starboard chassis structure 142 elevates the starboard side of the tank 104 above the supporting surface. The starboard chassis structure 142 is a rolling structure. The starboard chassis structure 142 forms a spring-loaded structure that absorbs transient impact forces that are applied to the starboard chassis structure 142 during the use of the invention 100. The location of the port chassis structure 141 is to the port side of the starboard chassis structure 142. The starboard chassis structure 142 forms a mirror image of the port chassis structure 141. The starboard chassis structure 142 comprises a starboard suspension shaft 271, a starboard spring 275 mount 272, a starboard wheel 276 mount 273, a plurality of starboard pivots 274, a starboard spring 275, and a starboard wheel 276.

The starboard suspension shaft 271 is a non-Euclidean prism structure. The starboard suspension shaft 271 is a rigid structure. The starboard suspension shaft 271 attaches the starboard chassis structure 142 to the forward exterior surface of the tank 104.

The starboard spring 275 mount 272 is a non-Euclidean prism structure. The starboard spring 275 mount 272 is a rigid structure. The starboard spring 275 mount 272 is a fixed structure that forms the superior anchor point for the starboard spring 275.

The starboard wheel 276 mount 273 is a prism structure. The starboard wheel 276 mount 273 is a rigid structure. The starboard wheel 276 mount 273 attaches the starboard wheel 276 to the balance of the starboard chassis structure 142 such that the starboard wheel 276 rotates relative to the starboard chassis structure 142. The starboard wheel 276 mount 273 further comprises a starboard superior arm mount 281, a starboard inferior arm mount 282, a starboard superior arm 283, a starboard inferior arm 284, and a starboard axle arm 285.

The starboard superior arm mount 281 is a rigid structure. The starboard superior arm mount 281 is a prism-shaped structure. The starboard superior arm mount 281 forms an anchor point on the superior brace 112 of the anterior chassis 101.

The starboard inferior arm mount 282 is a rigid structure. The starboard inferior arm mount 282 is a prism-shaped structure. The starboard inferior arm mount 282 forms an anchor point on the superior brace 112 of the anterior chassis 101.

The starboard superior arm 283 is a rigid structure. The starboard superior arm 283 is a prism-shaped structure. The starboard superior arm 283 is a roughly horizontally oriented structure that attaches the starboard axle arm 285 to the starboard superior arm mount 281.

The starboard inferior arm 284 is a rigid structure. The starboard inferior arm 284 is a prism-shaped structure. The starboard inferior arm 284 is a roughly horizontally oriented structure that attaches the starboard axle arm 285 to the starboard inferior arm mount 282.

The starboard axle arm 285 is a rigid structure. The starboard axle arm 285 is a prism-shaped structure. The starboard axle arm 285 is a roughly vertically oriented structure that attaches the starboard wheel 276 mount 273 to the starboard superior arm 283. The starboard axle arm 285 is a roughly vertically oriented structure that attaches the starboard wheel 276 mount 273 to the starboard superior arm 283.

Each of the plurality of starboard pivots 274 is a hardware item. Each of the plurality of starboard pivots 274 is a fastening device that attaches a first element of the starboard chassis structure 142 to a second element of the starboard chassis structure 142 such that the first element rotates relative to the second element. The plurality of starboard pivots 274 comprises a first starboard pivot 291, a second starboard pivot 292, a third starboard pivot 293, and a fourth starboard pivot 294.

The first starboard pivot 291 is a rotating fastening device. The first starboard pivot 291 is identical to the first port pivot 191. The second starboard pivot 292 is a rotating fastening device. The second starboard pivot 292 is identical to the first starboard pivot 291. The third starboard pivot 293 is a rotating fastening device. The third starboard pivot 293 is identical to the second starboard pivot 292. The fourth starboard pivot 294 is a rotating fastening device. The fourth starboard pivot 294 is identical to the third starboard pivot 293.

The starboard spring 275 is a mechanical structure. The starboard spring 275 forms a compression spring. The starboard spring 275 absorbs transient forces that are applied to the invention 100. In the first potential embodiment of the disclosure, the starboard spring 275 is a helical coil spring.

The starboard wheel 276 is a rotating structure. The starboard wheel 276 transfers a portion of the load of the invention 100 to the supporting surface. The starboard wheel 276 allows the invention 100 to roll over the supporting surface. The wheel and the spring are defined elsewhere in this disclosure.

The superior brace 112 is a prism-shaped structure. The superior brace 112 is a rigid structure. The superior brace 112 attaches the port chassis structure 141 to the starboard chassis structure 142 such that the port chassis structure 141 maintains a roughly fixed position relative to the starboard chassis structure 142 when the invention 100 rolls over the supporting surface.

The inferior brace 113 is a prism-shaped structure. The inferior brace 113 is a rigid structure. The inferior brace 113 attaches the port chassis structure 141 to the starboard chassis structure 142 such that the port chassis structure 141 maintains a roughly fixed position relative to the starboard chassis structure 142 when the invention 100 rolls over the supporting surface.

The handle structure 102 forms a grip that allows the person using the invention 100 to raise and lower the stern of the invention 100. The handle structure 102 comprises a port shaft 121, a starboard shaft 122, and a handle structure 102 brace 123.

The port shaft 121 is a prism-shaped structure. The port shaft 121 is a rigid structure. The port shaft 121 attaches to the exterior surface of the tank 104 along the inferior side of the tank 104. The port shaft 121 forms a grip that allows the person using the invention 100 to raise the stern of the invention 100 above the supporting surface. The port shaft 121 comprises a port posterior end 151 and a port anterior end 152. The port posterior end 151 is the congruent end of the prism structure of the port shaft 121 that is distal to the anterior chassis 101. The port anterior end 152 is the congruent end of the prism structure of the port shaft 121 that is proximal to the anterior chassis 101.

The starboard shaft 122 is a prism-shaped structure. The starboard shaft 122 is a rigid structure. The starboard shaft 122 attaches to the exterior surface of the tank 104 along the inferior side of the tank 104. The starboard shaft 122 forms a grip that allows the person using the invention 100 to raise the stern of the invention 100 above the supporting surface. The position of the port shaft 121 is to the port side of the starboard shaft 122. The starboard shaft 122 comprises a starboard posterior end 161 and a starboard anterior end 162. The starboard posterior end 161 is the congruent end of the prism structure of the port shaft 121 that is distal to the anterior chassis 101. The starboard anterior end 162 is the congruent end of the prism structure of the port shaft 121 that is proximal to the anterior chassis 101.

The handle structure 102 brace 123 is a prism-shaped structure. The handle structure 102 brace 123 is a rigid structure. The handle structure 102 brace 123 attaches the port anterior end 152 of the port shaft 121 to the starboard anterior end 162 of the starboard shaft 122 such that the position of the port anterior end 152 relative to the starboard anterior end 162 is fixed. The port chassis structure 141 attaches to the handle structure 102 brace 123 of the handle structure 102. The starboard chassis structure 142 attaches to the handle structure 102 brace 123 of the handle structure 102.

The posterior pedestal structure 103 is a pedestal structure that attaches to the exterior surface of the tank 104. The posterior pedestal structure 103 attaches to the aft inferior surfaces of the tank 104. The posterior pedestal structure 103 elevates the tank 104 above the supporting surface. The posterior pedestal structure 103 comprises a port pedestal structure 131 and a starboard pedestal structure 132.

The port pedestal structure 131 is a rigid structure. The port pedestal structure 131 is a U-shaped structure. The first arm of the U-shaped structure that forms the port pedestal structure 131 attaches to the exterior surface along the inferior side of the tank 104. The second arm of the U-shaped structure that forms the port pedestal structure 131 attaches to the exterior surface along the inferior side of the tank 104. The port pedestal structure 131 elevates the tank 104 above the supporting surface.

The starboard pedestal structure 132 is a rigid structure. The starboard pedestal structure 132 is a U-shaped structure. The first arm of the U-shaped structure that forms the starboard pedestal structure 132 attaches to the exterior surface along the inferior side of the tank 104. The second arm of the U-shaped structure that forms the starboard pedestal structure 132 attaches to the exterior surface along the inferior side of the tank 104. The starboard pedestal structure 132 elevates the tank 104 above the supporting surface. The starboard pedestal structure 132 is identical to the port pedestal structure 131.

The following nine paragraphs describe the assembly of the anterior chassis 101.

The inferior brace 113 attaches the inferior end of the port suspension shaft 171 to the inferior end of the starboard suspension shaft 271. The superior brace 112 attaches the lateral face of the prism structure of the port suspension shaft 171 to the lateral face of the prism structure of the starboard suspension shaft 271. The port suspension shaft 171 attaches to the tank 104 such that the anterior chassis 101 is suspended from the port suspension shaft 171. The starboard suspension shaft 271 attaches to the tank 104 such that the anterior chassis 101 is suspended from the starboard suspension shaft 271. The port spring 175 mount 172 attaches to the tank 104 such that the anterior chassis 101 is suspended from the port spring 175 mount 172. The starboard spring 275 mount 272 attaches to the tank 104 such that the anterior chassis 101 is suspended from the starboard spring 275 mount 272.

The following three paragraphs describe the assembly of the port chassis structure 141.

The port spring 175 mount 172 attaches the port suspension shaft 171 to the handle structure 102 brace 123. The port superior arm mount 181 attaches to the superior brace 112 such that the port superior arm mount 181 projects away from the superior brace 112 in the inferior direction. The port inferior arm mount 182 attaches to the inferior brace 113 such that the port inferior arm mount 182 projects away from the inferior brace 113. The port wheel 176 mount 173 forms the portion of the axle of the port wheel 176 that attaches to the port wheel 176 mount 173. The port spring 175 attaches the port spring 175 mount 172 to the port wheel 176 mount 173 such that the rotation of the port wheel 176 mount 173 deforms the port spring 175.

The first port pivot 191 attaches an end of the port superior arm 183 to the port superior arm mount 181 such that the port superior arm 183 rotates relative to the port superior arm mount 181. The second port pivot 192 attaches an end of the port superior arm 183 to the port axle arm 185 such that the port superior arm 183 rotates relative to the port axle arm 185. The third port pivot 193 attaches an end of the port inferior arm 184 to the port axle arm 185 such that the port inferior arm 184 rotates relative to the port axle arm 185. The fourth port pivot 194 attaches an end of the port inferior arm 184 to the port inferior arm mount 182 such that the port inferior arm 184 rotates relative to the port inferior arm mount 182.

The port wheel 176 mount 173 specifically attaches to the lateral face of the port axle arm 185 such that the port axle arm 185 does not rotate relative to the port wheel 176 mount 173. The port spring 175 specifically attaches to the lateral face of the port inferior arm 184 of the port wheel 176 mount 173.

The following three paragraphs describe the assembly of the starboard chassis structure 142.

The starboard spring 275 mount 272 attaches the starboard suspension shaft 271 to the handle structure 102 brace 123. The starboard superior arm mount 281 attaches to the superior brace 112 such that the starboard superior arm mount 281 projects away from the superior brace 112 in the inferior direction. The starboard inferior arm mount 282 attaches to the inferior brace 113 such that the starboard inferior arm mount 282 projects away from the inferior brace 113. The starboard wheel 276 mount 273 forms the portion of the axle of the starboard wheel 276 that attaches to the starboard wheel 276 mount 273. The starboard spring 275 attaches the starboard spring 275 mount 272 to the starboard wheel 276 mount 273 such that the rotation of the starboard wheel 276 mount 273 deforms the starboard spring 275.

The first starboard pivot 291 attaches an end of the starboard superior arm 283 to the starboard superior arm mount 281 such that the starboard superior arm 283 rotates relative to the starboard superior arm mount 281. The second starboard pivot 292 attaches an end of the starboard superior arm 283 to the starboard axle arm 285 such that the starboard superior arm 283 rotates relative to the starboard axle arm 285. The third starboard pivot 293 attaches an end of the starboard inferior arm 284 to the starboard axle arm 285 such that the starboard inferior arm 284 rotates relative to the starboard axle arm 285. The fourth starboard pivot 294 attaches an end of the starboard inferior arm 284 to the starboard inferior arm mount 282 such that the starboard inferior arm 284 rotates relative to the starboard inferior arm mount 282.

The starboard wheel 276 mount 273 specifically attaches to the lateral face of the starboard axle arm 285 such that the starboard axle arm 285 does not rotate relative to the starboard wheel 276 mount 273. The starboard spring 275 specifically attaches to the lateral face of the starboard inferior arm 284 of the starboard wheel 276 mount 273.

The following definitions were used in this disclosure:

Aft: As used in this disclosure, aft is a term that relates a first object to a second object. When the second object is closer to the stern of a vehicle, the second object is said to be aft of the first object. The term is commonly used on vessels and vehicles.

Anchor: As used in this disclosure, anchor means to hold an object firmly or securely.

Anchor Point: As used in this disclosure, an anchor point is a location to which a first object can be securely attached to a second object.

Anterior: As used in this disclosure, anterior is a term that is used to refer to the front side or direction of a structure. When comparing two objects, the anterior object is the object that is closer to the front of the structure.

Axle: As used in this disclosure, an axle is a cylindrical shaft that is inserted through the center of an object such that the object can rotate using the axle as an axis of rotation.

Bow: As used in this disclosure, the bow refers to the anterior side of an object, vehicle, or vessel. Specifically, the bow refers to the most forward element of the object in the direction of the primary sense of direction of the object vehicle, or vessel.

Brace: As used in this disclosure, a brace is a structural element that is used to support, stabilize, or otherwise steady an object.

Cart: As used in this disclosure, a cart is a small vehicle intended to be moved by a person. A synonym for cart is hand cart.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Chassis: As used in this disclosure, a chassis is a wheeled structure that is used to transport an attached load.

Compression Spring: As used in this disclosure, a compression spring is a spring that resists forces attempting to compress the spring in the direction of the center axis of the spring. The compression spring will return to its original position when the compressive force is removed.

Force of Gravity: As used in this disclosure, the force of gravity refers to a vector that indicates the direction of the pull of gravity on an object at or near the surface of the earth.

Forward: As used in this disclosure, forward is a term that relates a first object to a second object. When the first object is closer to the bow of a vehicle, the first object is said to be forward of the second object. The term is commonly used on vessels and vehicles. See bow, aft, port, starboard, and stern Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Hardware: As used in this disclosure, refers to one or more incidental objects: 1) that are readily and commercially available; and, 2) that are associated with the installation, operation or maintenance of a primary object. Always use incidental.

Helical Spring: As used in this disclosure, a helical spring is a compression spring shaped in the form of a cylindrical helix.

Helix: As used in this disclosure, a helix is the three-dimensional structure that would be formed by a wire that is wound uniformly around the surface of a cylinder or a cone. If the wire is wrapped around a cylinder the helix is called a cylindrical helix. If the wire is wrapped around a cone, the helix is called a conical helix. A synonym for conical helix would be a volute.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Incidental: As used in this disclosure, incidental refers to a second object that is associated with a first object but that: 1) does not significantly affect the characteristics of the first object; and, 2) the function of which can be readily replaced by or substituted with a third object.

Lateral: As used in this disclosure, the term lateral refers to the movement of an object that is perpendicular to the primary sense of direction of an object and parallel to the horizontal plane (or perpendicular to the vertical plane). Lateral movement is always perpendicular to the anterior-posterior axis. Lateral movement is often called sideways movement.

Mirror Image: As used in this disclosure, a mirror image refers to a second object that is a reproduction of a first object wherein the second object is identical to the first object except that the orientation of the second object is reversed relative to the first object as if the second object has been reflected by a plane of a mirror (often called the mirror plane or plane of reflection).

Non-Euclidean Prism: As used in this disclosure, a non-Euclidean prism is a prism structure wherein the center axis of the prism lies on a non-Euclidean plane or is otherwise formed with a curvature.

Non-Euclidean Structure: As used in this disclosure, a non-Euclidean structure is a structure wherein an axis of the structure lies on a non-Euclidean plane or is otherwise formed with a curvature.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

Pan: As used in this disclosure, a pan is a hollow containment structure. The pan has a shape selected from the group consisting of: a) a prism; and, b) a truncated pyramid. The pan has a single open face. The open face of the pan is often, but not always, the superior face of the pan. The open face is a surface selected from the group consisting of: a) an end of the prism structure that forms the pan; b) a lateral face of the prism structure that forms the pan, and, c) the base face of the truncated pyramid structure. A semi-enclosed pan refers to a pan wherein an end of prism structure of the pan and a portion of the lateral face of the pan is also open.

Pedestal: As used in this disclosure, a pedestal is an intermediary load bearing structure that that forms a load path between a supporting surface and an object, structure, or load.

Pivot: As used in this disclosure, a pivot is a rod or shaft around which an object rotates or swings.

Port: As used in this disclosure, port refers to the left side of a vehicle when a viewer is facing towards the primary sense of direction of the vehicle.

Posterior: As used in this disclosure, posterior is a term that is used to refer to the side of an object that is distal or in the opposite direction of the anterior side. When comparing two items, the posterior item is the item that is distal from the anterior of the object.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Rigid Structure: As used in this disclosure, a rigid structure is a solid structure formed from an inelastic material that resists changes in shape. A rigid structure will permanently deform as it fails under a force.

Roughly: As used in this disclosure, roughly refers to a comparison between two objects. Roughly means that the difference between one or more parameters of the two compared objects are not significantly different.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Starboard: As used in this disclosure, starboard refers to the right side of a vehicle when a viewer is facing towards the primary sense of direction of the vehicle.

Stern: As used in this disclosure, the stern refers to the posterior side of an object, vehicle, or vessel. The stern is distal from the bow along the primary sense of direction.

Superior: As used in this disclosure, the term superior refers to a directional reference that is parallel to and in the opposite direction of the force of gravity when an object is positioned or used normally.

Tradition: As used in this disclosure, a tradition refers to: 1) a set of thoughts or expectations regarding a subject or object; or, 2) a method of using an object; that, 3) is perceived to be widely or commonly shared across a population of people; and that, 4) is perceived to be widely or commonly shared across at least two generations within the population of people.

U-Shaped Structure: As used in this disclosure, a U-shaped structure refers to a three-sided structure comprising a crossbeam, a first arm, and a second arm. In a U-shaped structure, the first arm and the second arm project away from the crossbeam: 1) in the same direction; 2) at a roughly perpendicular angle to the crossbeam, and, 3) the span of the length of the first arm roughly equals the span of the length of the second arm.

Vehicle: As used in this disclosure, a vehicle is a device that is used for transporting passengers, goods, or equipment. The term motorized vehicle refers to a vehicle can move under power provided by an electric motor or an internal combustion engine.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction. Wheels are often further defined with a rim and spokes. Spokes are also commonly referred to as a wheel disk.

With respect to the above description, it is to be realized that the optimum dimensional relationship for the various components of the invention described above and in FIGS. 1 through 3 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A wheel barrow comprising
an anterior chassis, a handle structure, a posterior pedestal structure, and a tank;
wherein the anterior chassis, the handle structure, and the posterior pedestal structure attach to the tank;
wherein the handle structure allows for the manipulation the wheel barrow;
wherein the tank forms the containment structure of the wheel barrow;
wherein the anterior chassis is a rolling structure that elevates the anterior region of the tank above a supporting surface;
wherein the posterior pedestal structure raises the posterior region of the tank above the supporting surface;
wherein the wheel barrow has a dual wheel structure;
wherein the tank is a pan shaped structure;
wherein the tank forms the superior structure of the wheel barrow;
wherein the anterior chassis is a rolling structure;
wherein the anterior chassis attaches to the exterior surface of the tank and the handle structure;
wherein the anterior chassis forms the bow structure of the wheel barrow;

wherein the anterior chassis elevates the tank above the supporting surface;
wherein the handle structure forms a grip;
wherein the posterior pedestal structure is a pedestal structure that attaches to the exterior surface of the tank;
wherein the posterior pedestal structure attaches to the aft inferior surfaces of the tank;
wherein the posterior pedestal structure elevates the tank above the supporting surface;
wherein the anterior chassis comprises a plurality of chassis structures, a superior brace, and an inferior brace;
wherein the superior brace interconnects the plurality of chassis structures;
wherein the inferior brace interconnects the plurality of chassis structures;
wherein each of the plurality of chassis structures is a mechanical structure;
wherein each of the plurality of chassis structures is a structure that attaches to the forward exterior surfaces of the tank;
wherein each of the plurality of chassis structures is a rolling structure of the wheel barrow;
wherein each of the plurality of chassis structures enables the wheel barrow to roll over the supporting surface;
wherein each of the plurality of chassis structures elevates the tank above the supporting surface;
wherein the superior brace is a prism-shaped structure;
wherein the superior brace is a rigid structure;
wherein the inferior brace is a prism-shaped structure;
wherein the inferior brace is a rigid structure.

2. The wheel barrow according to claim 1
wherein the handle structure comprises a port shaft, a starboard shaft, and a handle structure brace;
wherein the port shaft is a prism-shaped structure;
wherein the port shaft is a rigid structure;
wherein the port shaft attaches to the exterior surface of the tank along the inferior side of the tank;
wherein the starboard shaft is a prism-shaped structure;
wherein the starboard shaft is a rigid structure;
wherein the starboard shaft attaches to the exterior surface of the tank along the inferior side of the tank;
wherein the position of the port shaft is to the port side of the starboard shaft;
wherein the handle structure brace is a prism-shaped structure;
wherein the handle structure brace is a rigid structure;
wherein the port chassis structure attaches to the handle structure brace of the handle structure;
wherein the starboard chassis structure attaches to the handle structure brace of the handle structure.

3. The wheel barrow according to claim 2
wherein the posterior pedestal structure comprises a port pedestal structure and a starboard pedestal structure;
wherein the port pedestal structure is a rigid structure;
wherein the port pedestal structure is a U-shaped structure;
wherein the first arm of the U-shaped structure that forms the port pedestal structure attaches to the exterior surface along the inferior side of the tank;
wherein the second arm of the U-shaped structure that forms the port pedestal structure attaches to the exterior surface along the inferior side of the tank;
wherein the port pedestal structure elevates the tank above the supporting surface;
wherein the starboard pedestal structure is a rigid structure;
wherein the starboard pedestal structure is a U-shaped structure;
wherein the first arm of the U-shaped structure that forms the starboard pedestal structure attaches to the exterior surface along the inferior side of the tank;
wherein the second arm of the U-shaped structure that forms the starboard pedestal structure attaches to the exterior surface along the inferior side of the tank;
wherein the starboard pedestal structure elevates the tank above the supporting surface;
wherein the starboard pedestal structure is identical to the port pedestal structure.

4. The wheel barrow according to claim 3
wherein the plurality of chassis structures comprises a port chassis structure and a starboard chassis structure;
wherein the port chassis structure is a mechanical structure;
wherein the port chassis structure is the chassis structure selected from the plurality of chassis structures that supports the port side of the tank;
wherein the starboard chassis structure is a mechanical structure;
wherein the starboard chassis structure is the chassis structure selected from the plurality of chassis structures that supports the starboard side of the tank;
wherein the superior brace attaches the port chassis structure to the starboard chassis structure such that the port chassis structure maintains a roughly fixed position relative to the starboard chassis structure when the wheel barrow rolls over the supporting surface;
wherein the inferior brace attaches the port chassis structure to the starboard chassis structure such that the port chassis structure maintains a roughly fixed position relative to the starboard chassis structure when the wheel barrow rolls over the supporting surface.

5. The wheel barrow according to claim 4
wherein the port chassis structure elevates the port side of the tank above the supporting surface;
wherein the port chassis structure is a rolling structure;
wherein the starboard chassis structure elevates the starboard side of the tank above the supporting surface;
wherein the starboard chassis structure is a rolling structure;
wherein the port chassis structure forms a spring-loaded structure;
wherein the starboard chassis structure forms a spring-loaded structure;
wherein the location of the port chassis structure is to the port side of the starboard chassis structure;
wherein the starboard chassis structure forms a mirror image of the port chassis structure.

6. The wheel barrow according to claim 5
wherein the port chassis structure comprises a port suspension shaft, a port spring mount, a port wheel mount, a plurality of port pivots, a port spring, and a port wheel;
wherein the port suspension shaft attaches the port chassis structure to the forward exterior surface of the tank;
wherein the port spring mount is a fixed structure that forms the superior anchor point for the port spring;
wherein the port wheel mount attaches the port wheel to the balance of the port chassis structure such that the port wheel rotates relative to the port chassis structure;
wherein each of the plurality of port pivots is a fastening device that attaches a first element of the port chassis structure to a second element of the port chassis structure such that the first element rotates relative to the second element;

wherein the port spring is a mechanical structure;

wherein the port spring forms a compression spring;

wherein the port spring absorbs transient forces that are applied to the wheel barrow;

wherein the port wheel is a rotating structure;

wherein the port wheel transfers a portion of the load of the wheel barrow to the supporting surface.

7. The wheel barrow according to claim 6 wherein the starboard chassis structure comprises a starboard suspension shaft, a starboard spring mount, a starboard wheel mount, a plurality of starboard pivots, a starboard spring, and a starboard wheel;

wherein the starboard suspension shaft attaches the starboard chassis structure to the forward exterior surface of the tank;

wherein the starboard spring mount is a fixed structure that forms the superior anchor point for the starboard spring;

wherein the starboard wheel mount attaches the starboard wheel to the balance of the starboard chassis structure such that the starboard wheel rotates relative to the starboard chassis structure;

wherein each of the plurality of starboard pivots is a fastening device that attaches a first element of the starboard chassis structure to a second element of the starboard chassis structure such that the first element rotates relative to the second element;

wherein the starboard spring is a mechanical structure;

wherein the starboard spring forms a compression spring;

wherein the starboard spring absorbs transient forces that are applied to the wheel barrow;

wherein the starboard wheel is a rotating structure;

wherein the starboard wheel transfers a portion of the load of the wheel barrow to the supporting surface.

8. The wheel barrow according to claim 7 wherein the port suspension shaft is a non-Euclidean prism structure;

wherein the port suspension shaft is a rigid structure;

wherein the port spring mount is a non-Euclidean prism structure;

wherein the port spring mount is a rigid structure;

wherein the port wheel mount is a prism structure;

wherein the port wheel mount is a rigid structure;

wherein the starboard suspension shaft is a non-Euclidean prism structure;

wherein the starboard suspension shaft is a rigid structure;

wherein the starboard spring mount is a non-Euclidean prism structure;

wherein the starboard spring mount is a rigid structure;

wherein the starboard wheel mount is a prism structure;

wherein the starboard wheel mount is a rigid structure.

9. The wheel barrow according to claim 8 wherein the port wheel mount further comprises a port superior arm mount, a port inferior arm mount, a port superior arm, a port inferior arm, and a port axle arm;

wherein the port superior arm mount is a rigid structure;

wherein the port superior arm mount is a prism-shaped structure;

wherein the port superior arm mount forms an anchor point on the superior brace of the anterior chassis;

wherein the port inferior arm mount is a rigid structure;

wherein the port inferior arm mount is a prism-shaped structure;

wherein the port inferior arm mount forms an anchor point on the superior brace of the anterior chassis;

wherein the port superior arm is a rigid structure;

wherein the port superior arm is a prism-shaped structure;

wherein the port superior arm is a roughly horizontally oriented structure that attaches the port axle arm to the port superior arm mount;

wherein the port inferior arm is a rigid structure;

wherein the port inferior arm is a prism-shaped structure;

wherein the port inferior arm is a roughly horizontally oriented structure that attaches the port axle arm to the port inferior arm mount;

wherein the port axle arm is a rigid structure;

wherein the port axle arm is a prism-shaped structure;

wherein the port axle arm is a roughly vertically oriented structure that attaches the port wheel mount to the port superior arm;

wherein the port axle arm is a roughly vertically oriented structure that attaches the port wheel mount to the port superior arm;

wherein the starboard wheel mount further comprises a starboard superior arm mount, a starboard inferior arm mount, a starboard superior arm, a starboard inferior arm, and a starboard axle arm;

wherein the starboard superior arm mount is a rigid structure;

wherein the starboard superior arm mount is a prism-shaped structure;

wherein the starboard superior arm mount forms an anchor point on the superior brace of the anterior chassis;

wherein the starboard inferior arm mount is a rigid structure;

wherein the starboard inferior arm mount is a prism-shaped structure;

wherein the starboard inferior arm mount forms an anchor point on the superior brace of the anterior chassis;

wherein the starboard superior arm is a rigid structure;

wherein the starboard superior arm is a prism-shaped structure;

wherein the starboard superior arm is a roughly horizontally oriented structure that attaches the starboard axle arm to the starboard superior arm mount;

wherein the starboard inferior arm is a rigid structure;

wherein the starboard inferior arm is a prism-shaped structure;

wherein the starboard inferior arm is a roughly horizontally oriented structure that attaches the starboard axle arm to the starboard inferior arm mount;

wherein the starboard axle arm is a rigid structure;

wherein the starboard axle arm is a prism-shaped structure;

wherein the starboard axle arm is a roughly vertically oriented structure that attaches the starboard wheel mount to the starboard superior arm;

wherein the starboard axle arm is a roughly vertically oriented structure that attaches the starboard wheel mount to the starboard superior arm.

10. The wheel barrow according to claim 9 wherein the plurality of port pivots comprises a first port pivot, a second port pivot, a third port pivot, and a fourth port pivot;

wherein the first port pivot is a rotating fastening device;

wherein the first port pivot is identical to the first starboard pivot;

wherein the second port pivot is a rotating fastening device;

wherein the second port pivot is identical to the first port pivot;
wherein the third port pivot is a rotating fastening device;
wherein the third port pivot is identical to the second port pivot;
wherein the fourth port pivot is a rotating fastening device;
wherein the fourth port pivot is identical to the third port pivot;
wherein the plurality of starboard pivots comprises a first starboard pivot, a second starboard pivot, a third starboard pivot, and a fourth starboard pivot;
wherein the first starboard pivot is a rotating fastening device;
wherein the first starboard pivot is identical to the first port pivot;
wherein the second starboard pivot is a rotating fastening device;
wherein the second starboard pivot is identical to the first starboard pivot;
wherein the third starboard pivot is a rotating fastening device;
wherein the third starboard pivot is identical to the second starboard pivot;
wherein the fourth starboard pivot is a rotating fastening device;
wherein the fourth starboard pivot is identical to the third starboard pivot.

11. The wheel barrow according to claim 10
wherein the port shaft comprises a port posterior end and a port anterior end;
wherein the port posterior end is the congruent end of the prism structure of the port shaft that is distal to the anterior chassis;
wherein the port anterior end is the congruent end of the prism structure of the port shaft that is proximal to the anterior chassis;
wherein the starboard shaft comprises a starboard posterior end and a starboard anterior end;
wherein the starboard posterior end is the congruent end of the prism structure of the port shaft that is distal to the anterior chassis;
wherein the starboard anterior end is the congruent end of the prism structure of the port shaft that is proximal to the anterior chassis.

12. The wheel barrow according to claim 11 wherein the handle structure brace attaches the port anterior end of the port shaft to the starboard anterior end of the starboard shaft such that the position of the port anterior end relative to the starboard anterior end is fixed.

13. The wheel barrow according to claim 12
wherein the inferior brace attaches the inferior end of the port suspension shaft to the inferior end of the starboard suspension shaft;
wherein the superior brace attaches the lateral face of the prism structure of the port suspension shaft to the lateral face of the prism structure of the starboard suspension shaft;
wherein the port suspension shaft attaches to the tank such that the anterior chassis is suspended from the port suspension shaft;
wherein the starboard suspension shaft attaches to the tank such that the anterior chassis is suspended from the starboard suspension shaft;
wherein the port spring mount attaches to the tank such that the anterior chassis is suspended from the port spring mount;
wherein the starboard spring mount attaches to the tank such that the anterior chassis is suspended from the starboard spring mount.

14. The wheel barrow according to claim 13
wherein the port spring mount attaches the port suspension shaft to the handle structure brace;
wherein the port superior arm mount attaches to the superior brace such that the port superior arm mount projects away from the superior brace in the inferior direction;
wherein the port inferior arm mount attaches to the inferior brace such that the port inferior arm mount projects away from the inferior brace;
wherein the port wheel mount forms the portion of the axle of the port wheel that attaches to the port wheel mount;
wherein the port spring attaches the port spring mount to the port wheel mount such that the rotation of the port wheel mount deforms the port spring;
wherein the starboard spring mount attaches the starboard suspension shaft to the handle structure brace;
wherein the starboard superior arm mount attaches to the superior brace such that the starboard superior arm mount projects away from the superior brace in the inferior direction;
wherein the starboard inferior arm mount attaches to the inferior brace such that the starboard inferior arm mount projects away from the inferior brace;
wherein the starboard wheel mount forms the portion of the axle of the starboard wheel that attaches to the starboard wheel mount;
wherein the starboard spring attaches the starboard spring mount to the starboard wheel mount such that the rotation of the starboard wheel mount deforms the starboard spring.

15. The wheel barrow according to claim 14
wherein the first port pivot attaches an end of the port superior arm to the port superior arm mount such that the port superior arm rotates relative to the port superior arm mount;
wherein the second port pivot attaches an end of the port superior arm to the port axle arm such that the port superior arm rotates relative to the port axle arm;
wherein the third port pivot attaches an end of the port inferior arm to the port axle arm such that the port inferior arm rotates relative to the port axle arm;
wherein the fourth port pivot attaches an end of the port inferior arm to the port inferior arm mount such that the port inferior arm rotates relative to the port inferior arm mount;
wherein the first starboard pivot attaches an end of the starboard superior arm to the starboard superior arm mount such that the starboard superior arm rotates relative to the starboard superior arm mount;
wherein the second starboard pivot attaches an end of the starboard superior arm to the starboard axle arm such that the starboard superior arm rotates relative to the starboard axle arm;
wherein the third starboard pivot attaches an end of the starboard inferior arm to the starboard axle arm such that the starboard inferior arm rotates relative to the starboard axle arm;
wherein the fourth starboard pivot attaches an end of the starboard inferior arm to the starboard inferior arm mount such that the starboard inferior arm rotates relative to the starboard inferior arm mount.

16. The wheel barrow according to claim 15
wherein the port wheel mount specifically attaches to the lateral face of the port axle arm such that the port axle arm does not rotate relative to the port wheel mount;
wherein the port spring specifically attaches to the lateral face of the port inferior arm of the port wheel mount;
wherein the starboard wheel mount specifically attaches to the lateral face of the starboard axle arm such that the starboard axle arm does not rotate relative to the starboard wheel mount;
wherein the starboard spring specifically attaches to the lateral face of the starboard inferior arm of the starboard wheel mount.

\* \* \* \* \*